(12) United States Patent
Francis

(10) Patent No.: US 11,142,925 B2
(45) Date of Patent: *Oct. 12, 2021

(54) ENGINEERED FLOOR AND SCAFFOLD SYSTEM

(71) Applicant: Bil-Jax, Inc., Archbold, OH (US)

(72) Inventor: Einstein Francis, Archbold, OH (US)

(73) Assignee: Bil-Jax, Inc., Archbold, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/879,127

(22) Filed: May 20, 2020

(65) Prior Publication Data
US 2020/0362587 A1 Nov. 19, 2020

Related U.S. Application Data

(63) Continuation of application No. 16/713,803, filed on Dec. 13, 2019, now Pat. No. 10,781,605, which is a
(Continued)

(51) Int. Cl.
*E04H 15/56* (2006.01)
*E04H 3/28* (2006.01)
(Continued)

(52) U.S. Cl.
CPC ......... *E04H 15/56* (2013.01); *E04B 1/34352* (2013.01); *E04B 5/10* (2013.01); *E04G 1/06* (2013.01); *E04G 1/08* (2013.01); *E04G 1/15* (2013.01); *E04H 3/28* (2013.01); *F16B 9/02* (2013.01)

(58) Field of Classification Search
CPC .. E04H 3/24; E04H 3/28; E04H 15/56; E04G 1/15; E04G 1/152; E04B 5/10

USPC ......... 52/7, 125.5, 125.6, 263, 651.1, 655.1, 52/843, 846, 848, 849; 135/116, 120.3, 135/908; 108/56.1; 182/179.1, 186.6,
(Continued)

(56) References Cited

U.S. PATENT DOCUMENTS 1,586,053 A 5/1926 Snyder
3,130,470 A * 4/1964 Bowden .................. E04G 11/48
249/192
(Continued)

FOREIGN PATENT DOCUMENTS

CA 2705360 A1 5/2009
CA 2758997 A1 10/2010
(Continued)

OTHER PUBLICATIONS

United States Patent Office, International Search Report issued in application No. PCT/US2016/47116, dated Dec. 28, 2016, 3 pages, Alexandria, Virginia.
(Continued)

*Primary Examiner* — Robert Canfield
(74) *Attorney, Agent, or Firm* — Marshall & Melhorn, LLC

(57) ABSTRACT

A scaffold apparatus may have a saddle with a platform and two spaced apart parallel sides extending above the platform. The apparatus may also have a beam having a beam flange attached to an end portion of the beam. The apparatus may also have an upright connector with a bottom portion, where bottom portion may have an insert, and a plate attached to the bottom portion.

10 Claims, 14 Drawing Sheets

Related U.S. Application Data continuation of application No. 15/237,730, filed on Aug. 16, 2016, now Pat. No. 10,508,467.

(60) Provisional application No. 62/207,121, filed on Aug. 19, 2015.

(51) Int. Cl.
*E04G 1/15* (2006.01)
*E04B 1/343* (2006.01)
*E04B 5/10* (2006.01)
*E04G 1/06* (2006.01)
*E04G 1/08* (2006.01)
*F16B 9/02* (2006.01)

(58) Field of Classification Search
USPC ........ 182/186.7, 186.8; 403/217–219, 232.1, 403/237, 302, 306, 312, 339, 340, 393
See application file for complete search history.

(56) References Cited

U.S. PATENT DOCUMENTS

| | | | |
|---|---|---|---|
| 3,221,466 A | 12/1965 | Downing, Jr. et al. | |
| 3,316,680 A | 5/1967 | Chrastek | |
| 3,628,628 A * | 12/1971 | Gilbreath | E04G 1/152 |
| | | | 182/222 |
| 3,722,167 A * | 3/1973 | Rousey | E04B 9/10 |
| | | | 52/506.07 |
| 3,752,262 A * | 8/1973 | Helms | E04G 5/14 |
| | | | 182/113 |
| 3,811,237 A | 5/1974 | Bettinger | |
| 3,924,370 A | 12/1975 | Caucelglia et al. | |
| 3,927,498 A * | 12/1975 | Benedetti | E04C 2/384 |
| | | | 52/79.1 |
| 4,229,919 A * | 10/1980 | Hughes | A47C 11/00 |
| | | | 264/31 |
| 4,630,417 A * | 12/1986 | Collier | F24F 7/10 |
| | | | 52/263 |
| 4,633,626 A | 1/1987 | Freeman et al. | |
| 4,635,413 A * | 1/1987 | Hansen | E04C 2/384 |
| | | | 52/92.2 |
| 4,730,428 A | 3/1988 | Head et al. | |
| 4,759,162 A * | 7/1988 | Wyse | E04H 3/24 |
| | | | 52/126.6 |
| 4,850,162 A | 7/1989 | Albrecht | |
| 4,984,654 A * | 1/1991 | Anderson | E04G 1/152 |
| | | | 182/186.7 |
| 5,048,242 A | 9/1991 | Cline | |
| 5,058,352 A | 10/1991 | Loiselle et al. | |
| 5,060,426 A * | 10/1991 | Jantzen | E04B 1/34321 |
| | | | 52/126.1 |
| 5,226,440 A | 7/1993 | Fuhrman | |
| 5,488,810 A * | 2/1996 | Horton | E04B 1/2608 |
| | | | 403/178 |
| 5,778,999 A | 7/1998 | Nealeigh | |
| 5,787,663 A * | 8/1998 | Wehrmann | E04B 5/14 |
| | | | 403/217 |
| 5,791,096 A * | 8/1998 | Chen | E04F 15/02458 |
| | | | 52/126.6 |
| 5,848,501 A * | 12/1998 | Taipale | E04F 11/002 |
| | | | 52/126.4 |
| 6,276,111 B1 | 8/2001 | Pittman, Sr. et al. | |
| 7,360,343 B1 * | 4/2008 | Spransy | E04F 15/02452 |
| | | | 52/263 |
| 7,389,614 B2 | 6/2008 | Sullivan | |
| 7,500,335 B1 * | 3/2009 | Kjose | E04H 3/28 |
| | | | 52/182 |
| 7,707,780 B2 * | 5/2010 | Ouellet | E04B 5/10 |
| | | | 52/7 |
| 7,874,115 B2 | 1/2011 | Thiede | |
| 8,215,063 B1 * | 7/2012 | Francis | E04H 3/24 |
| | | | 52/6 |
| 8,479,459 B2 * | 7/2013 | Tucker | F24S 25/12 |
| | | | 52/173.3 |
| 8,584,404 B2 * | 11/2013 | Heidenreich | E04B 1/24 |
| | | | 52/79.5 |
| 9,506,248 B1 | 11/2016 | Fields et al. | |
| 2003/0167701 A1 | 9/2003 | Rich | |
| 2004/0211137 A1 * | 10/2004 | Thiede | E04B 5/02 |
| | | | 52/272 |
| 2005/0155526 A1 * | 7/2005 | Blanchette | E04H 3/24 |
| | | | 108/27 |
| 2006/0115324 A1 * | 6/2006 | Zenda | F16B 7/18 |
| | | | 403/292 |
| 2007/0094962 A1 | 5/2007 | Schwoerer | |
| 2008/0053003 A1 * | 3/2008 | Hockemeyer | E04B 1/34315 |
| | | | 52/22 |
| 2008/0053017 A1 | 3/2008 | Hockemeyer et al. | |
| 2008/0053018 A1 * | 3/2008 | Hockemeyer | E04H 1/1205 |
| | | | 52/263 |
| 2008/0053032 A1 | 3/2008 | Hockemeyer et al. | |
| 2008/0263968 A1 | 10/2008 | Day | |
| 2009/0212195 A1 * | 8/2009 | Arocena Bergareche | |
| | | | E04G 11/38 |
| | | | 249/13 |
| 2009/0301359 A1 * | 12/2009 | Tait | E04B 1/003 |
| | | | 108/56.3 |
| 2011/0290588 A1 * | 12/2011 | Hall | E04F 11/1851 |
| | | | 182/113 |
| 2012/0005969 A1 | 1/2012 | Broden | |
| 2012/0031017 A1 * | 2/2012 | Stroyer | E01D 19/02 |
| | | | 52/157 |
| 2012/0233961 A1 * | 9/2012 | Matos | E04C 3/07 |
| | | | 52/846 |
| 2013/0014466 A1 * | 1/2013 | Eggers | E04B 1/24 |
| | | | 52/653.2 |
| 2014/0123576 A1 | 5/2014 | Meyer | |
| 2014/0262619 A1 * | 9/2014 | Bains | E04G 1/15 |
| | | | 182/113 |
| 2015/0121800 A1 | 5/2015 | Cipriani | |
| 2015/0337532 A1 * | 11/2015 | Cipriani | E04B 9/10 |
| | | | 52/848 |
| 2016/0208507 A1 | 7/2016 | Davis | |
| 2017/0321413 A1 * | 11/2017 | Pridham | E04F 15/02183 |
| 2018/0135321 A1 * | 5/2018 | Francis | E04H 3/126 |
| 2019/0169931 A1 * | 6/2019 | Bright | E06C 1/39 |

FOREIGN PATENT DOCUMENTS

| | | | |
|---|---|---|---|
| CA | 2758997 A1 * | 10/2010 | ........ E04F 15/02452 |
| CA | 2932677 A1 * | 12/2017 | .............. E04G 1/12 |
| DE | 9101717 U1 * | 12/1991 | ........ E04F 15/02458 |
| DE | 9101717 U1 | 12/1991 | |
| DE | 29520623 U1 | 2/1996 | |
| DE | 10209976 A1 | 10/2003 | |
| EP | 0167509 A2 * | 1/1986 | .............. E04H 15/56 |
| EP | 0167509 A2 | 1/1986 | |
| EP | 383317 A * | 8/1990 | .............. E04G 1/14 |
| EP | 393317 A | 10/1990 | |
| EP | 2304134 B1 | 3/2017 | |
| EP | 2304134 B1 * | 3/2017 | .............. E04H 3/28 |
| FR | 2585752 A1 * | 2/1987 | ........ E04F 15/02452 |
| FR | 2585752 A1 | 2/1987 | |
| GB | 1489411 A * | 10/1977 | .............. E04G 5/06 |
| GB | 1489411 A | 10/1997 | |
| JP | 2004270432 A | 9/2004 | |
| JP | 2004270432 A * | 9/2004 | .............. E04H 15/46 |
| KR | 2017130739 A * | 11/2017 | .............. E04B 1/98 |
| WO | 9117330 A1 | 11/1991 | |
| WO | 2016080618 A1 | 5/2016 | |

OTHER PUBLICATIONS

40×80 Frame Tent Victoria BC by Rental Newtwork Ltd. Rental Network Ltd, Jan. 2, 2015 (Jan. 2, 2015 [online], [retreived on Oct. 18, 2016], Retreived from the internet; <URL:https://www.youtube.com/watch?v=C0YqEGnCn5c>.

(56) References Cited

OTHER PUBLICATIONS

TF-2100 Tent Flooring Systems Assembly Instructions, Biljax Event Solutions. Dec. 18, 2015 (Dec. 18, 2015) [online], [retrieved on Oct. 14, 2016], Retrieved from the internet: <URL:http//www.biljax.com/clientuploads/Catalogs/Event/TF2100%20Asembly%20Instructions.pdf>.

TF2100 Biljax Video HD 1080p. Biljax Scaffold and Event Solutions, Oct. 2, 2015 (Oct. 2, 2015) [online], [retrieved on Oct. 14, 2016], Retrieved from the internet: <URL: https://www.youtube.com/watch?v=K1eFWSDhKLY>.

\* cited by examiner

ENGINEERED FLOOR AND SCAFFOLD SYSTEM

CROSS REFERENCE TO RELATED APPLICATION

This application claims the benefit of U.S. provisional patent application Ser. No. 62/207,121 filed on Aug. 19, 2015 and U.S. nonprovisional patent application Ser. No. 15/237,730 filed on Aug. 16, 2016, U.S. nonprovisional application Ser. No. 16/713,803 filed Dec. 13, 2019, all of which are fully incorporated by reference.

TECHNICAL FIELD

A unique modular flooring system for clear span tents including system scaffolding is described.

BACKGROUND

Conventional tent, awning and canopy frame structures that can be assembled and disassembled are known. They are commonly made up of cylindrical tubing and various types of junction elements or connectors, or so-called slip fit or slip-on fittings, commonly termed corner, ridge intermediate, intermediate, three-way crown, four-way crown, six-way crown and eight-way crown fitting.

Often, the prior art systems do not include means for sealing against the weather and other environmental conditions at the joints where the various panels are joined. Another disadvantage is that the prior art shelters have to be built on unlevel ground, which is the normal situation. Unlevel ground poses a number of problems when a number of units have to be added to each other to produce a relatively large shelter.

Another shortcoming is that the prior art systems are not strong enough to support the tent and tent frame structure.

SUMMARY

The modular flooring system with scaffold understructure described herein provides a solution to the problems of the prior art systems. The system is capable of use with most clear span tent manufacturer's structures.

Clear span tents and frame structures are designed and manufactured in such a way that they can be assembled and disassembled at a site. The clear span tent and structures are temporary structures and they are used in the event rental industries most of the time. The clear span tent and the frame structures are designed be to setup on a leveled surface. Most of the clear span tent legs (uprights) are pinned to a base plate and the base plates are secured to a leveled surface. All of the base plates in a particular tent setup have to be on the same level. These base plates transfer the entire load from the tent to the ground or to a floor where the base plates are secured.

In the majority of the time the clear span tents and frame structures are not used on a leveled surface; instead they are used on an unleveled ground like golf courses. One or a few of the base plates may sit on the ground level but the rest of them are in a different elevation. In order to get a leveled surface for the base plates the customer has to create a platform. In the rental industry there are no engineered platforms designed to accommodate clear span tents and structures. So the customers use different staging products or they create a platform with scaffolding, wood and plywood.

The above mentioned poses the following challenges.
1. Safety of the tent platform.
2. These platforms are custom platforms and the load capacities of the platforms are questionable.
3. Transferring the tent base plate reactions and the platform load to the ground is questionable.
4. Most of the time there is no proper way securing the platform from uplift loads.
5. No proper guide line to assemble a clear span tent on top of a platform.

The system described herein provides a solution for all the above challenges because it is designed, engineered and manufactured to take different clear span tents and structures.

The engineered system solves many of the problems of prior art systems. First, the sides of the tent extend outside and below beam connectors. The enclosure system is economical and light weight in construction and provides for depositing rain water and snow on the ground outboard of the scaffold assembly.

Secondly, the tent and tent frame are supported by scaffold legs which support the engineered system. The platform does not support the tent and tent frame. Instead, the platform transfers the live load to the system scaffold legs. The upright connectors also transfer (Upright) load to the system scaffold leg. The beam may also transfer loads (platform live load, load from the tent and weight of the tent) to the system scaffold leg.

The tent floor can be 8" from the ground to 15 feet or even more from the ground. As a result, this system may support a tent on very unlevel ground. The load is transferred to the ground through the legs.

The components may be as follows: universal beam, upright connector, beam connector, platforms, platform filler, universal saddle, and system scaffolding under structure.

Other objects and advantages will become apparent to those skilled in the art upon a review of the following detailed description of the preferred embodiments and the accompanying drawings.

IN THE DRAWINGS

DETAILED DESCRIPTION

Described is an engineered flooring system for clear span tents and the structures. The flooring system may have system scaffolding (under structures), and a flooring system. The understructure can be any system scaffolding as long as they have the right load capacity. Flooring systems may have the following items: saddle, universal beam, platform, and upright connectors. The base plates will be replaced by the upright connectors.

The upright connectors are specifically designed for tents so the customer has to use the right upright connector for the right tent. The flooring system accommodates most of the clear span tents and structures. When you use different tents from different manufactures customers have to use the specific upright connector for the specified tent. The universal beam, saddle and the platforms are the same for any type of tent.

The flooring system is designed to transfer the entire load coming from the platform and the tent; the load will be transferred to the scaffold legs. The universal beam, saddle and the platform will transfer live load to the legs and the upright connector will transfer the tent load.

The other advantages of this system are the flooring system is designed to go low as 8" elevation to any platform heights. Also, the tent platform will be the exact size of the tent so the platform will not stick outside the tent. This makes the tent floor water proof because when it rains, the water will flow from the wall to the ground not to the platform.

Figure 1:
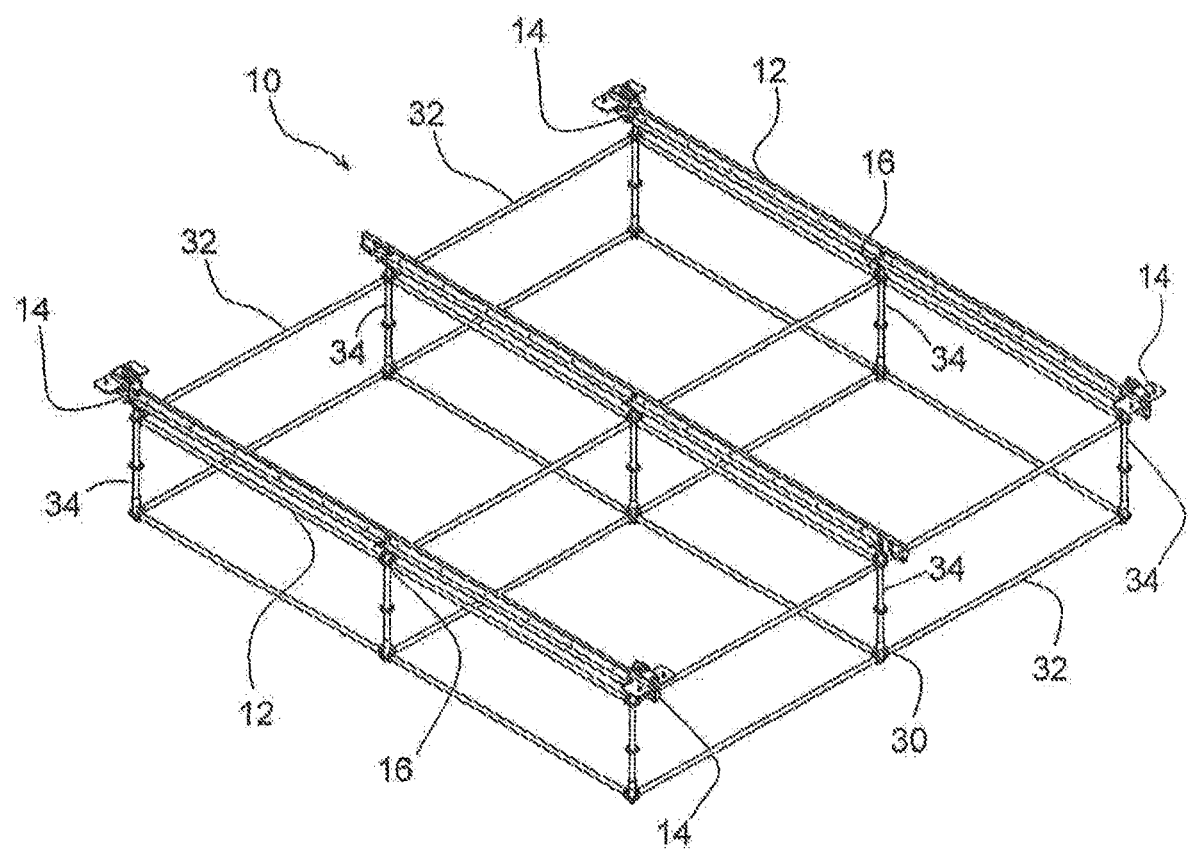
FIG. 1 shows one embodiment of a scaffold system without a platform.

FIG. 1 shows on embodiment of a scaffold system without a platform. FIG. 1 also shows scaffold system 10 including universal beam 12, upright connector 14 and saddle 16.

FIG. 1 also shows conventional scaffold components. For example, FIG. 1 shows connecting devices 30, horizontal posts 32 and scaffold legs 34.

Figure 2:
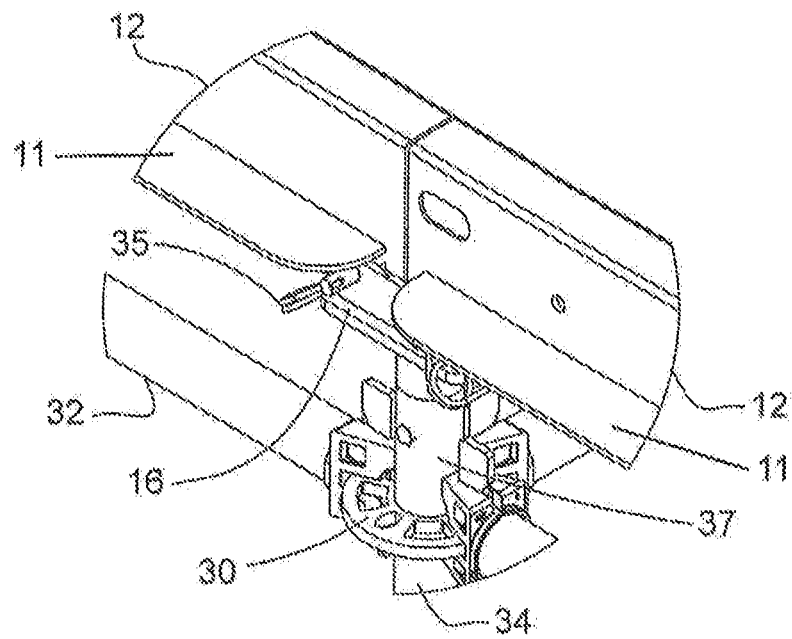
FIG. 2 shows one embodiment of a universal beam in place on a saddle.

FIG. 2 shows the universal beam 12 in place on a saddle 16. Lips 11 support flooring sections 22.

Figure 3:
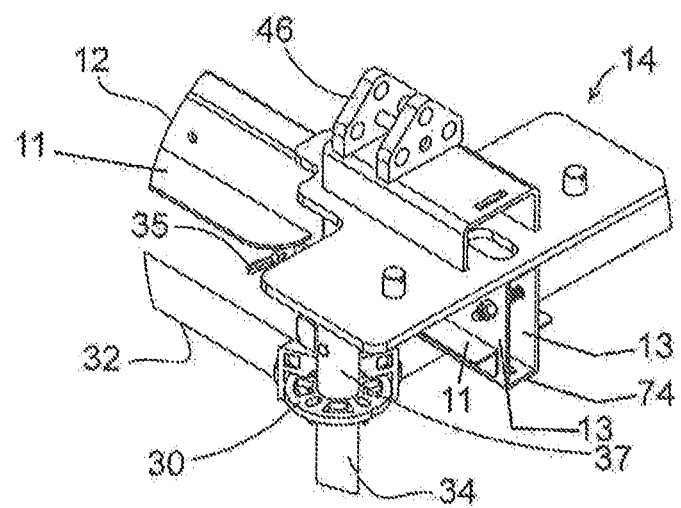
FIG. 3 shows one embodiment of an upright connector.

FIG. 3 shows the upright connector 14. Upright connector 14 engages universal beam 12. Also shown is upright portion 46 of upright connector 14 and pin lock 35 of saddle 16. Also shown is beam 12 comprising bottom 74 and sides 13.

As shown in FIGS. 1-3, the flooring system 10 is designed to transfer the entire load coming from the platform and the tent to the scaffold legs. Universal beam 12, saddle 16, and the platform will transfer platform live load to the legs. Upright connector 14 will transfer the tent load to the scaffold legs.

Figure 4:
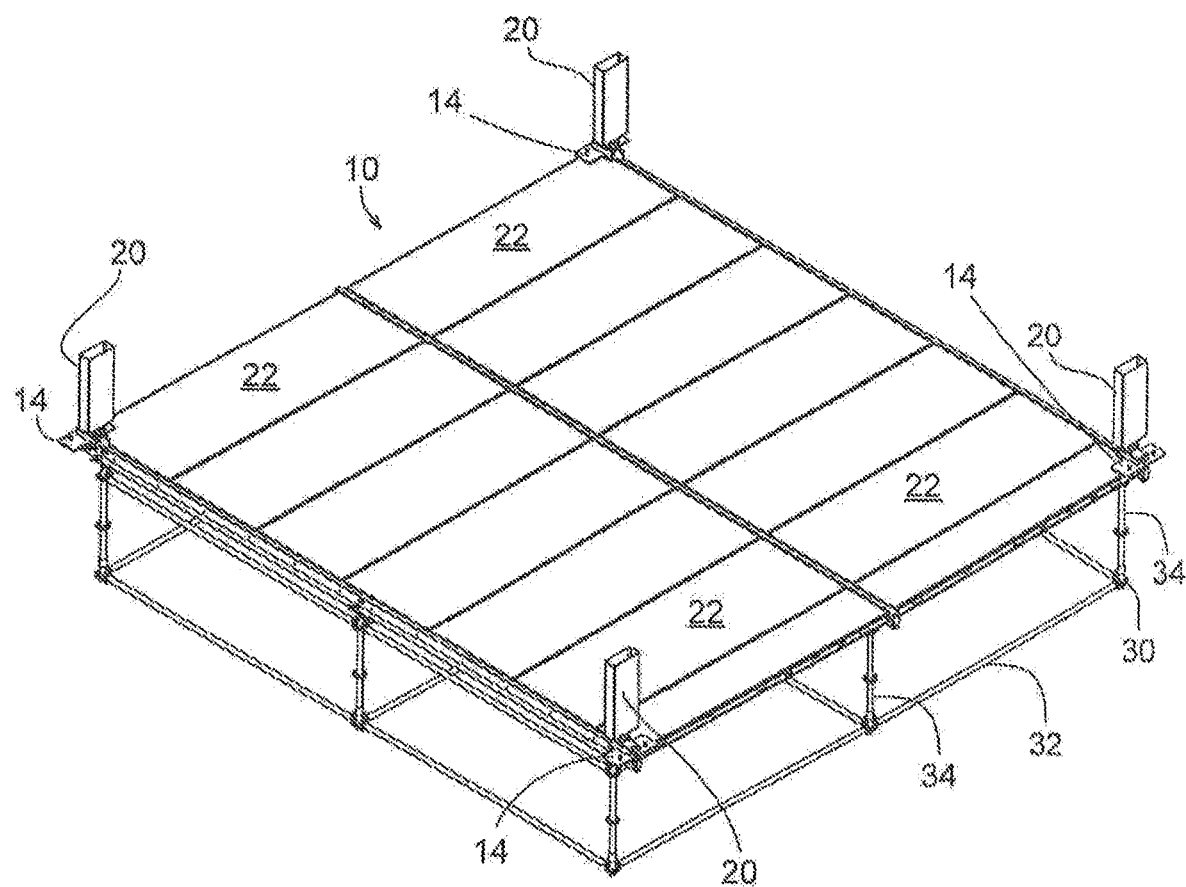
FIG. 4 shows one embodiment of clear span tent legs and platforms (flooring) in place on the scaffold system of FIG. 1.

FIG. 4 shows clear span tent legs and platforms (flooring) in place on the scaffold system of FIG. 1. FIG. 4 shows clear span tent legs 20, and platforms 22.

Figure 5:
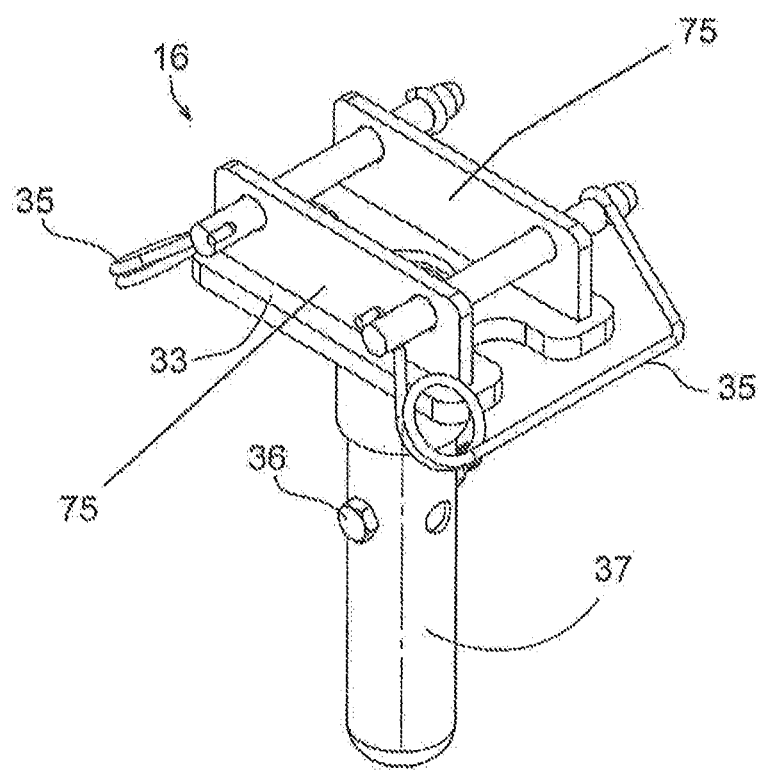
FIG. 5 shows one embodiment of a saddle.

FIG. 5 shows saddle 16. Saddle 16 includes insert, platform 33, and pin-snap lock shores 35. Hex jam nut 36 and screw cap 38 also are shown. Hex jam nut 36 extends through saddle post 37. Also shown is saddle 16 including platform 33 and sides 75. Saddle post 37 extends downwardly from platform 22 where it connects with connecting device 30 and scaffold leg 34. As can be appreciated in FIGS. 5, 19 and 20, the beam 12 is received between sides 75.

Figure 6:
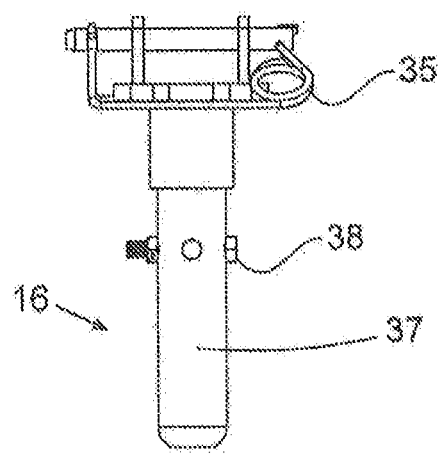
FIG. 6 shows a side view of the saddle of FIG. 5.

FIG. 6 shows a side view of saddle 16 of FIG. 5.

Figure 7:
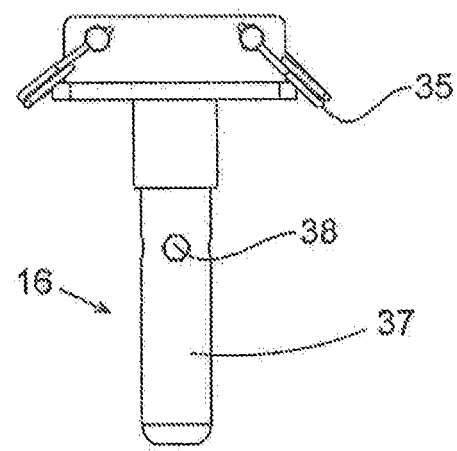
FIG. 7 shows an end view of the saddle of FIG. 5.

FIG. 7 shows an end view of saddle 16 of FIG. 5.

Figure 8:
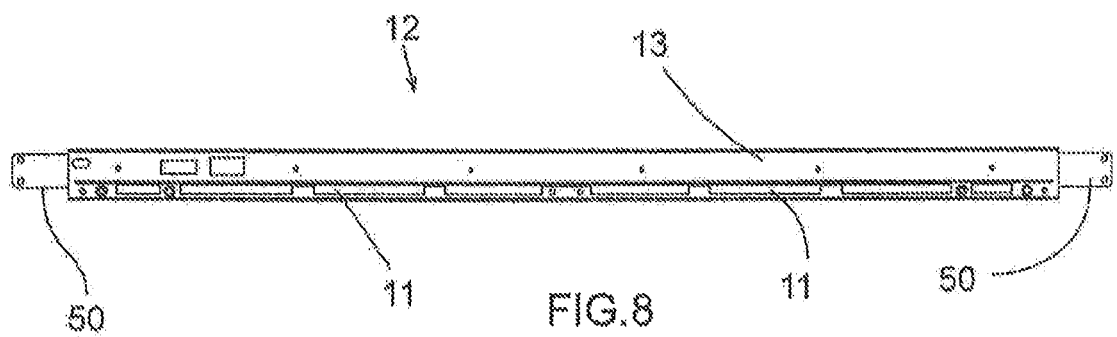
FIG. 8 shows a side view of the universal beam.
Figure 10:
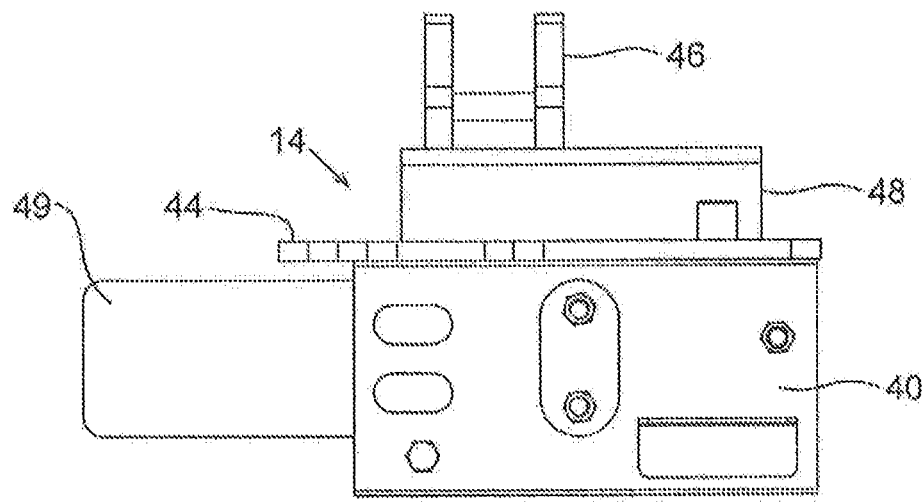
FIG. 10 shows a side view of the upright connector of FIG. 3.
Figure 11:
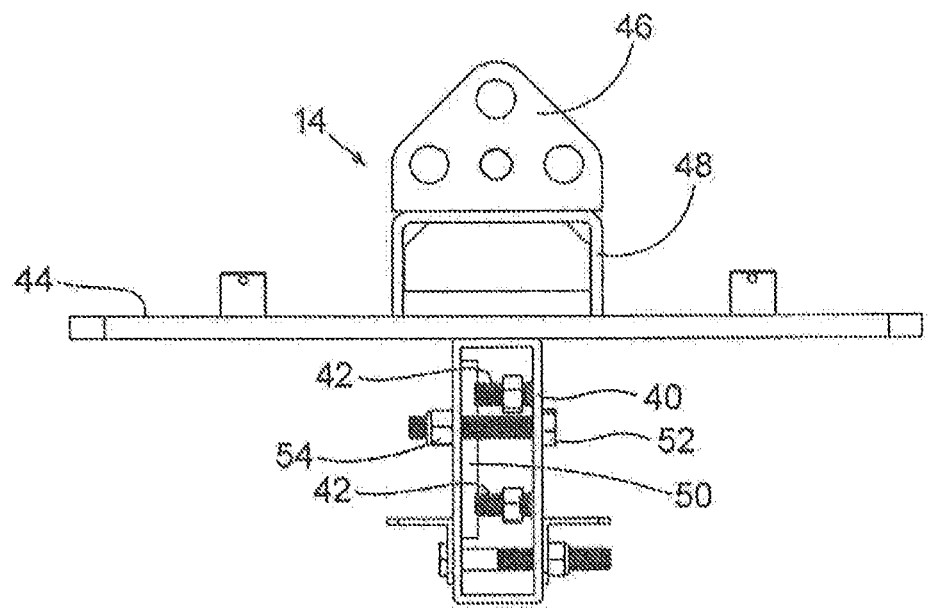
FIG. 11 shows an end view of the upright connector of FIG. 3.

FIG. 8 shows a side view of universal beam 12. Beam 12 also includes flanges 50. Insert 49 is secured to upright connector 14 as shown in FIGS. 10 and 11 with bolt 52 and nut 54. As can be appreciated from FIG. 20, at least one mechanical fastener connects the spaced apart sides 75 to the beam 12 and at least one mechanical fastener connects the spaced apart sides 75 to a bottom portion 40 of the connector 14.

Figure 9:
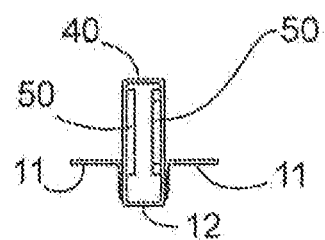
FIG. 9 shows an end view of the universal beam.

FIG. 9 shows an end view of universal beam 12. From FIG. 9 it can be appreciated that the flanges 50 are attached to a first side and a second side of an opening in the beam 12. From FIG. 20, it also be appreciated that the insert 49 of connector 14 is parallel but spaced apart from the beam flange 50.

FIG. 10 shows a side view of upright connector 14 of FIG. 3. Upright connector 14 engages universal beam 12.

Connector 14 comprises the bottom portion 40 which circumscribes beam 12. Thus, as shown in FIG. 11, the bottom portion 40 may be hollow. It can also be seen that the insert 49 is attached to a side of an opening in the bottom portion 40. Bolts with hex heads and lock nuts hold insert 49 in place. Screw cap flat head sockets 42 also hold insert 49 in place. Connector 14 also comprises flat plate 44 and upright portion 46.

Upright portion 46 engages clear span tent legs 20 as shown in FIG. 4. In one embodiment, tent legs 20 circumscribe upright portion 46 and rests on flat plate 44. The design of upright connector may vary depending on the design of legs 20.

The upright connectors are specifically designed so the customer has to use the right upright connector for the right tent. The flooring system accommodates most of the clear span tents and structures. The universal beam, saddle, and the platforms are same for any type of tent.

FIG. 11 shows an end view of upright connector 14 of FIG. 3. Housing 48 supports upright portion 46.

Figure 12:
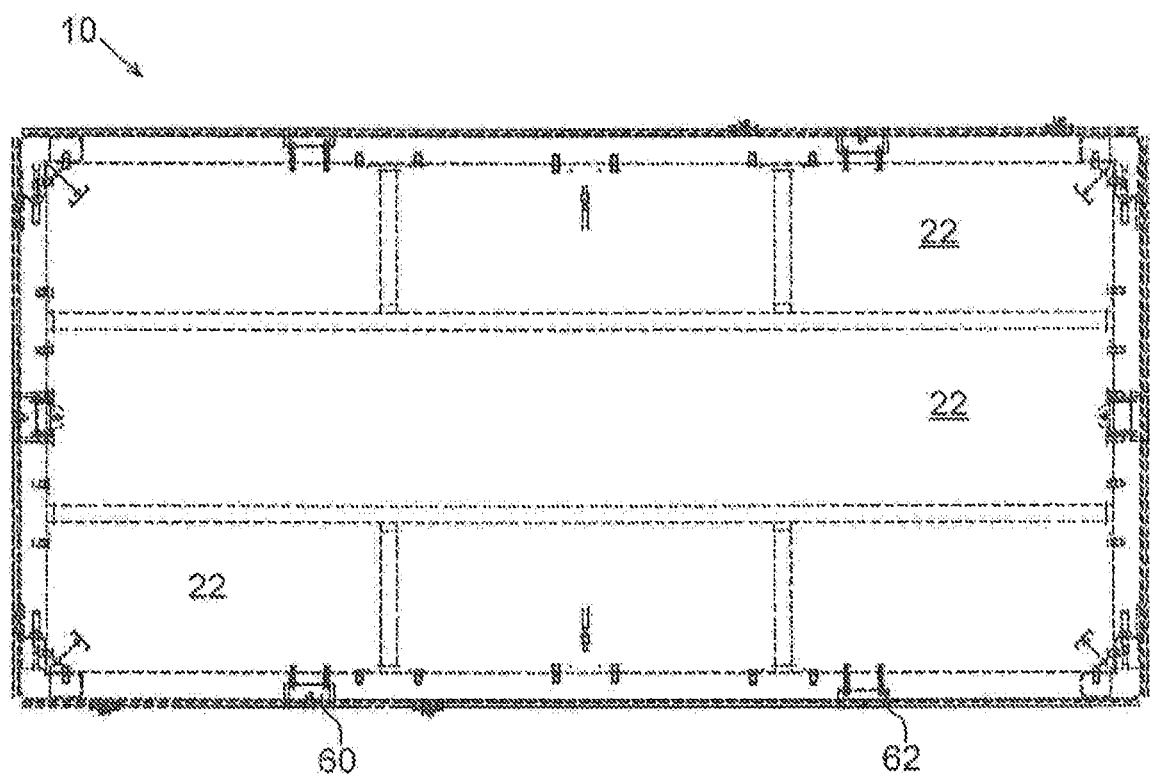
FIG. 12 is a bottom view of the platform system shown in FIG. 4.

FIG. 12 is a bottom view of the platform system shown in FIG. 4. Male roto locks 60 and female roto locks 62 also are shown.

Figure 13:
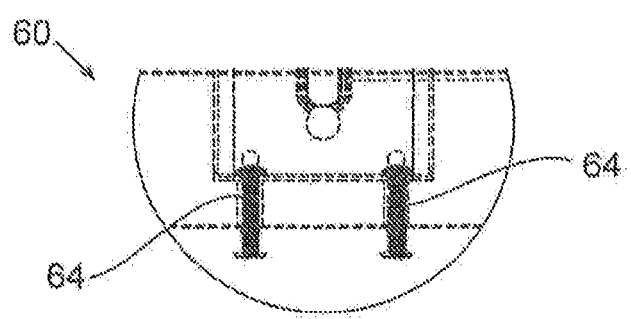
FIG. 13 shows one embodiment of a male roto lock used with the platform system shown in FIG. 12.

FIG. 13 shows male roto lock 60 used with the scaffold system shown in FIG. 12

Figure 14:
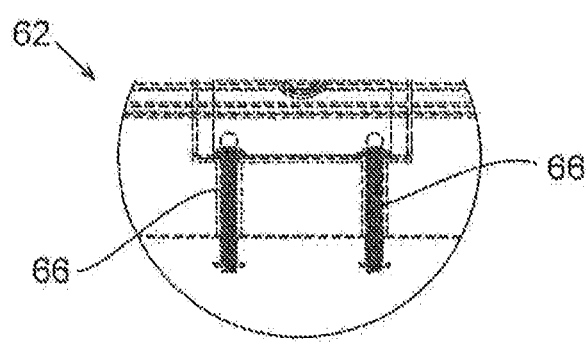
FIG. 14 shows one embodiment of a female roto lock used with the platform system shown in FIG. 13.

FIG. 14 shows female roto lock 62 used with the scaffold system shown in FIG. 13

Figure 15:
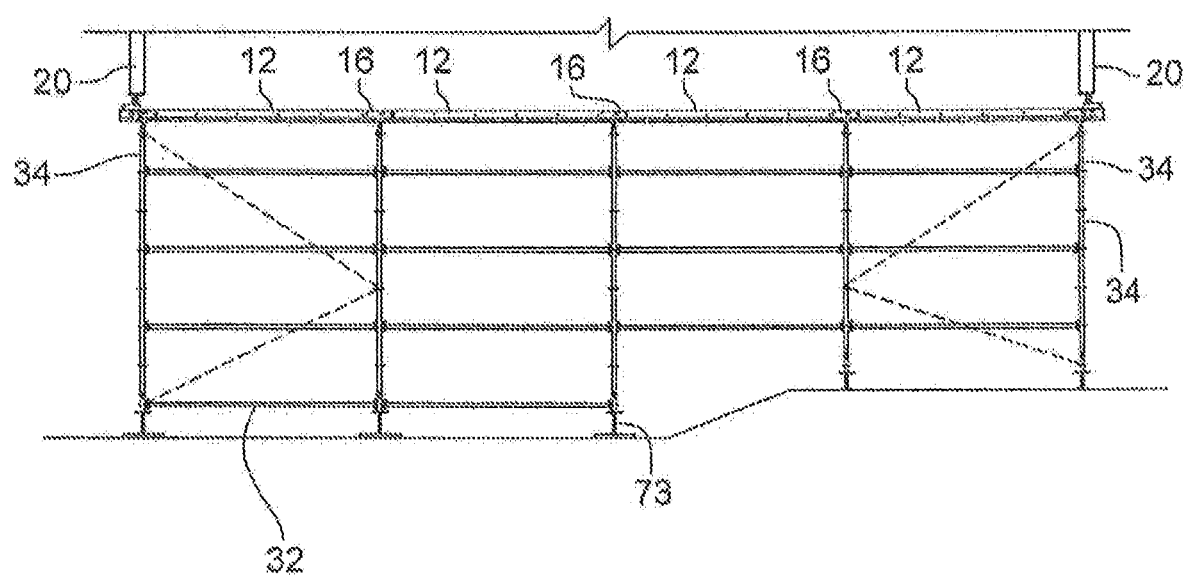
FIG. 15 shows the elevation of one embodiment of the system in greater detail.

FIG. 15 shows the scaffold system in greater detail. The platforms of FIG. 12 are connected with another platform of the same size by roto lock. The roto lock is not use to connect the platform to the beam. The lock underneath the platform will secure the platform to the beam. Also shown is jack 73.

Every universal beam is connected with two universal saddles. FIG. 15 shows 4 universal beams. Other embodiments may include even more universal beams connected together to form a chain. At the end you have two upright connectors connected to the distal end and proximal end of the string.

Figure 16:
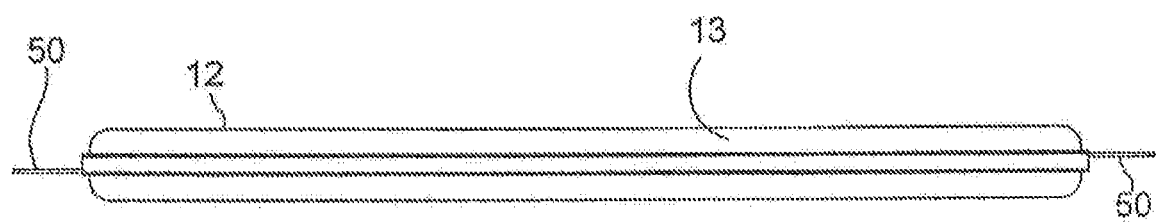
FIG. 16 is a top view of one embodiment of the universal beam.
Figure 17:
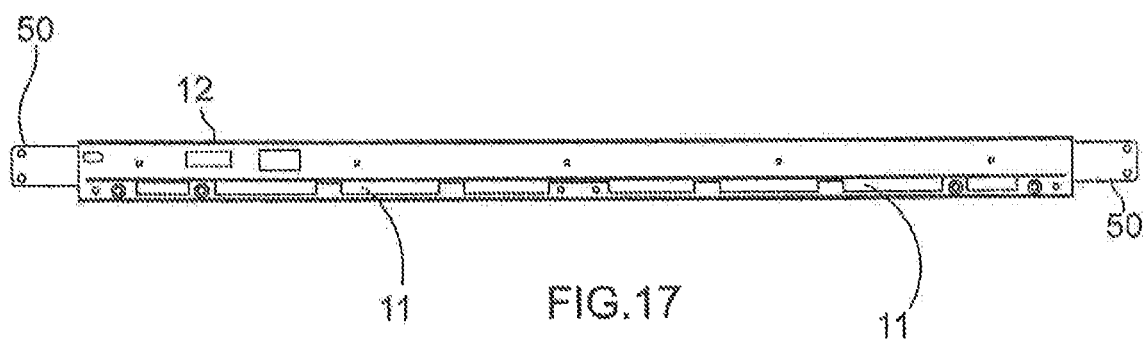
FIG. 17 is a side view of one embodiment of the universal beam.

FIGS. 16 and 17 are views of the universal beam in greater detail. Inserts 50 may be welded to one side of beam 12 but preferably they are welded to opposite sides of the beam 12. This makes the beam very special because you eliminate left and right beams. One beam fit all sides.

Figure 18:
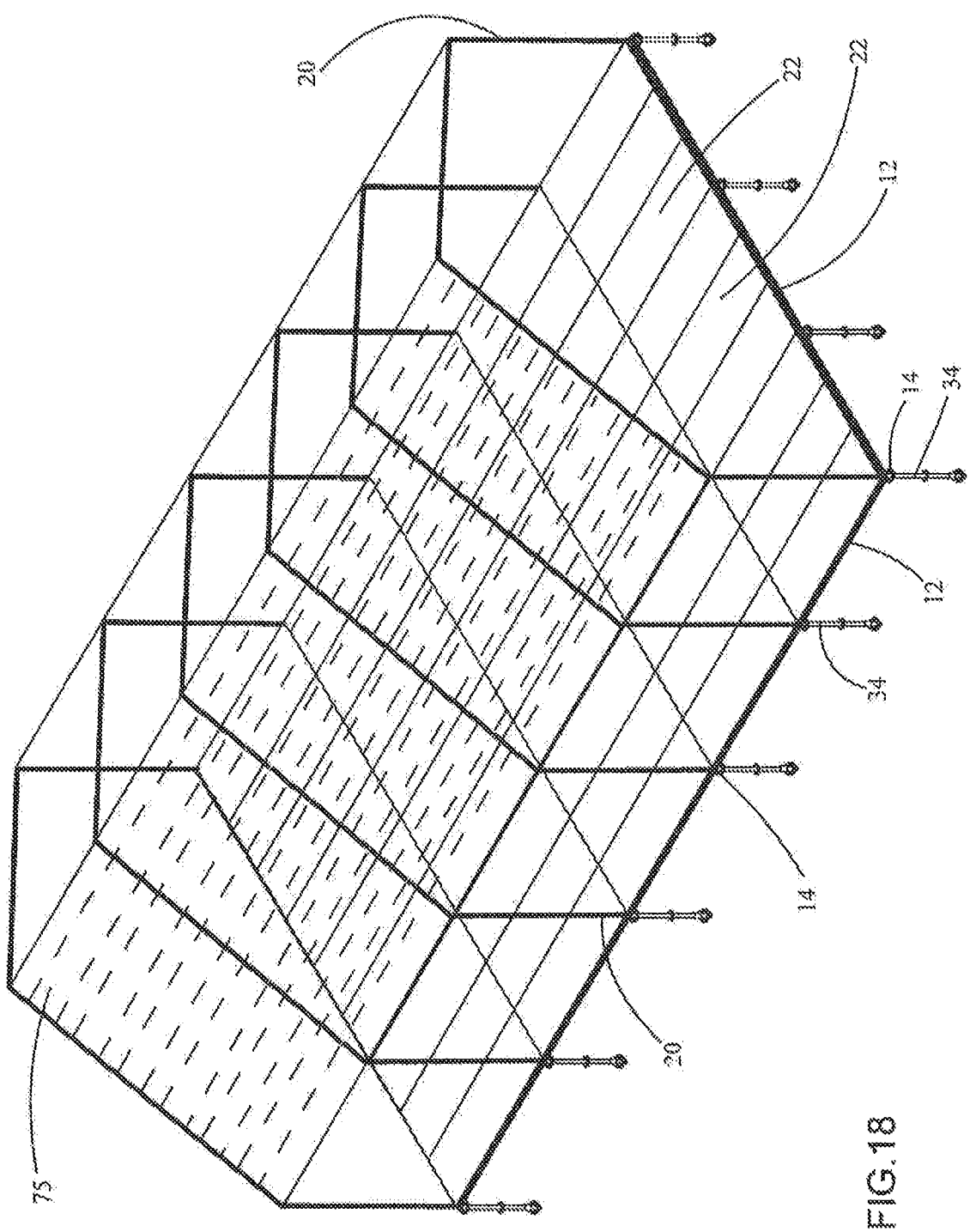
FIG. 18 shows one embodiment of a tent and tent frame supported.

FIG. 18 shows a tent and tent frame. Shown are beam 12, connector 14, tent legs 20, and scaffold legs 34. Portions of tent 75 are shown in phantom.

Figure 19:
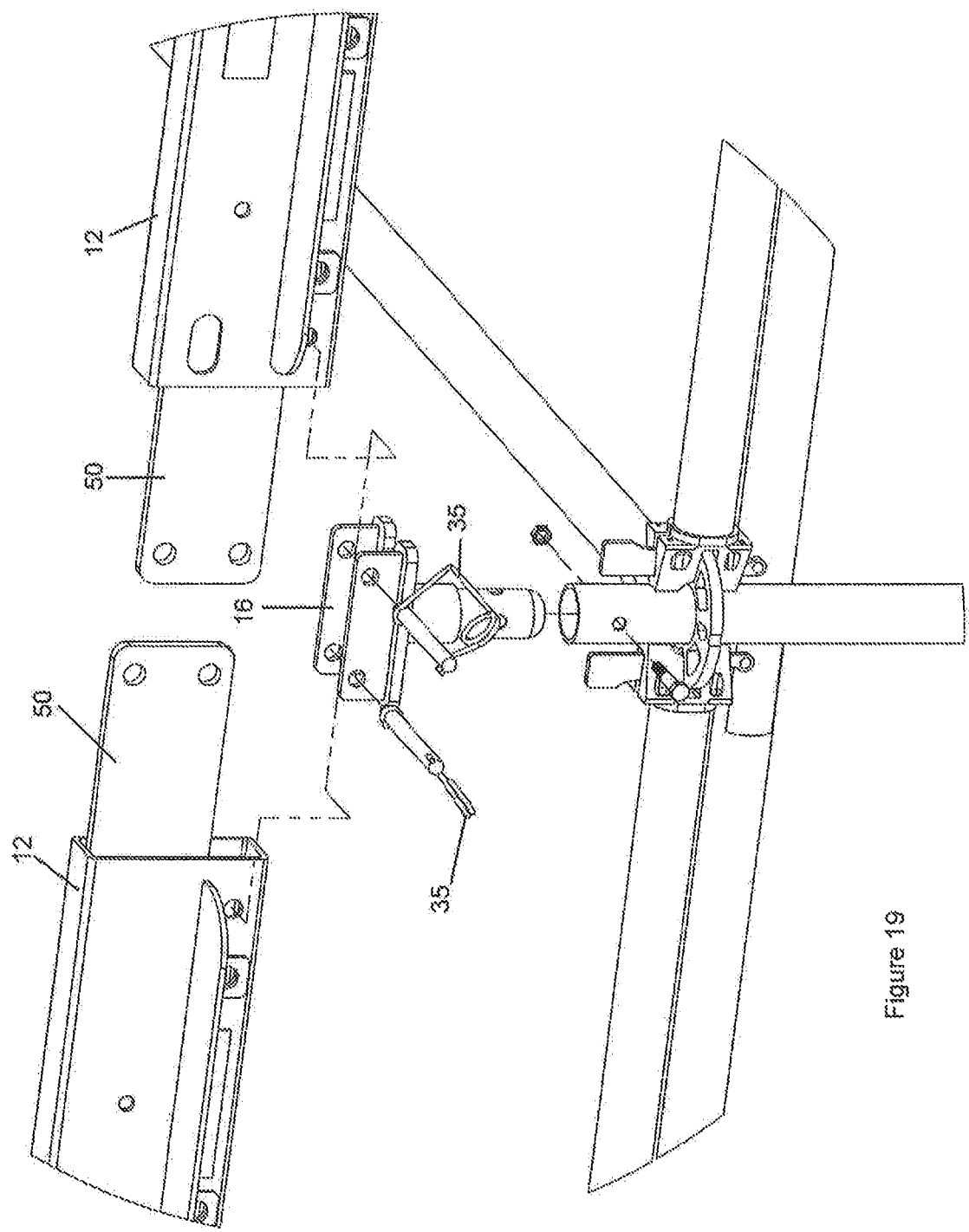
FIG. 19 is an exploded view showing how one embodiment of a beam may connect to one embodiment of a saddle.

FIG. 19 is an exploded view showing scaffold legs 34 supporting saddles 16, saddles 16 support beams 12. Beams 12 include flanges 50. FIG. 19 also shows a first flange 50 attached to an end of a beam 12 and a second flange 50 attached to an end of a beam 12. The first flange 50 is located within the second beam 12 and the second flange 50 is located within the first beam 12 so that the first and second flanges 50 are adjacent one another. FIG. 19 shows the beams 12 received between the sides of the saddle 16. FIG. 19 also shows at least one mechanical fastener connecting the sides of the saddle 16 with the beams 12. Pin-snap lock shores 35 connect flanges 50 to saddle 16. FIG. 19 is an exploded view of FIG. 2.

Figure 20:
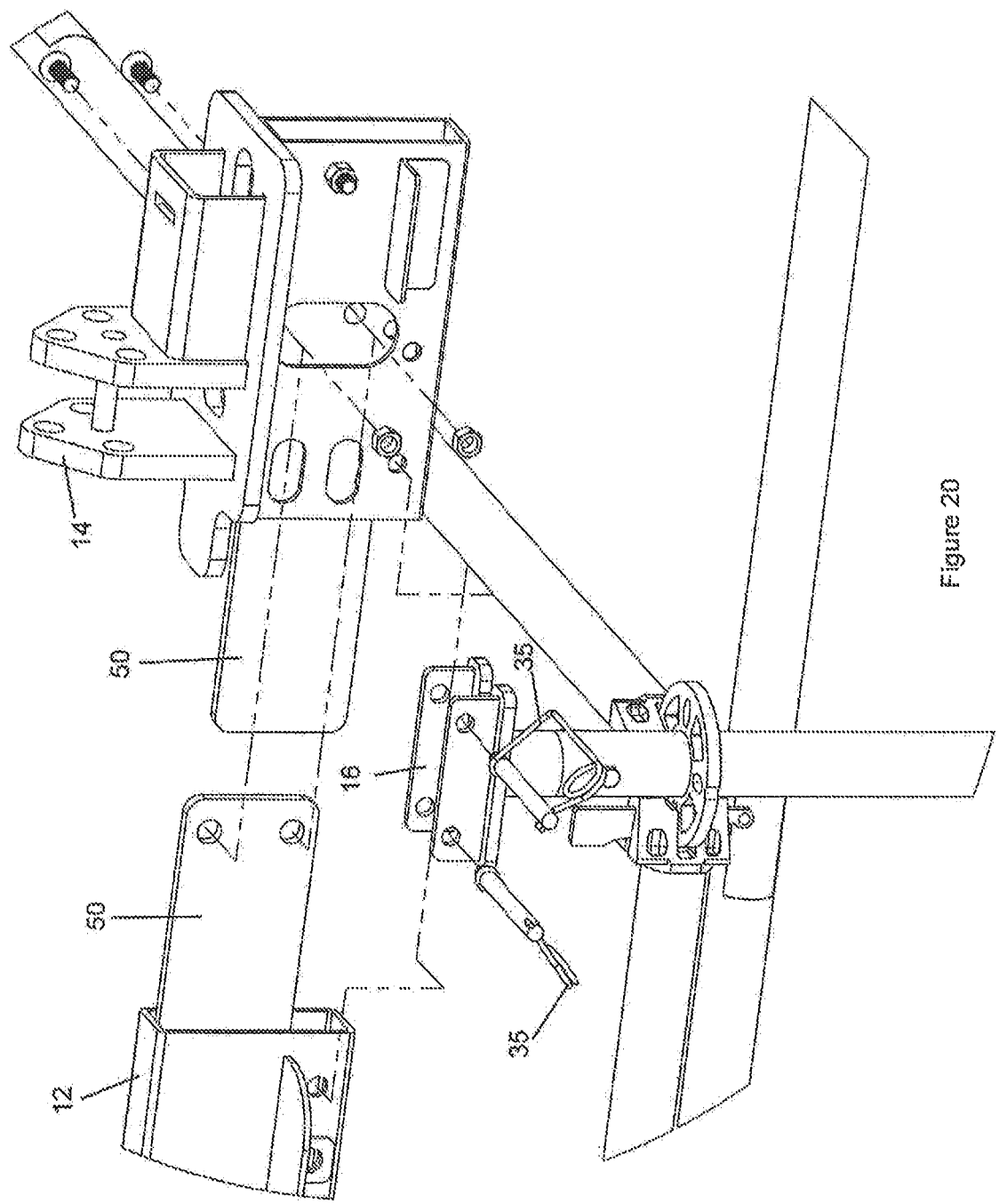
FIG. 20 is an exploded view showing how one embodiment of an upright connector may engage with one embodiment of a beam.

FIG. 20 is an exploded view showing scaffold legs 34 supporting saddles 16, saddles 16 support beams 12, beams 12 support upright connectors 14 and upright connectors 14 support tent legs 20, as shown in FIG. 4. Beams 12 include flanges 50. Pin-snap lock shores 35 connect flanges 50 to saddle 16. Upright connector 14 engages beam 12. Bolts with hex heads and lock nuts hold connector 14 in place on beam 12. FIG. 20 is an exploded view of FIG. 3.

The other advantages of this system are the flooring system is designed to go low as 8" elevation to any platform heights. Also, the tent platform will be the exact size of the tent so the platform will not stick outside of the tent. This makes the tent floor water proof because when it rains, the water will flow from the wall to the ground not to the platform.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

What is claimed is:

1. A scaffold apparatus, comprising:
 a beam, comprising:
  at least one plate flange having one end connected to said beam and a second end cantilevered from said beam, said second end adapted to be located in a second beam,
  at least one lip extending transversely from a side of said beam substantially along the length of said beam;
 a saddle adapted to support said beam; and
 an upright connector adapted to connect with said beam.

2. The scaffold apparatus of claim 1, wherein said beam comprises:
 an upper surface, a lower surface, first and second side surfaces, and first and second end portions, said surfaces defining a substantially rectangular cross section and a hollow interior portion;
 a first plate flange and a second plate flange each having a connection portion secured within said hollow interior portion at said first and second end portions, respectively, wherein said first plate flange and said second plate flange each have cantilevered ends extending from said first and second end portions, respectively;
 a first lip and a second lip, wherein said first and second lips extend transversely from said first and second side surfaces, respectively, below a longintudinal centerline of said beam, wherein said lips are coplanar with one another.

3. The scaffold apparatus of claim 2, wherein said beam is adapted to be selectively joined to the saddle by a pin snap lock, wherein said pin snap lock extends through a first side of said saddle, through said first side surface of said beam, through said interior portion of said beam, through said second side surface of said beam, and through a second side of said saddle.

4. The scaffold apparatus of claim 2, wherein said first plate flange on beam is adapted to be located within an interior portion of another beam.

5. The scaffold apparatus of claim 2, wherein at least one of said end portions is adapted to be selectively located in the saddle and selectively secured thereto.

6. The scaffold apparatus of claim 2, wherein said first plate flange or said second plate flange are adapted to be selectively located in an interior of the upright connector and selectively secured thereto.

7. A scaffold apparatus, comprising:
 a beam, comprising:
  an upper surface, a lower surface, first and second side surfaces, and first and second end portions, and a hollow interior portion;
  a first plate flange and a second plate flange each having a connection portion secured within said hollow interior portion at said first and second end portions, respectively;
  a first lip and a second lip, wherein said first and second lips extend transversely from said first and second side surfaces, respectively, of said beam, wherein said lips are coplanar with one another;
 a saddle adapted to support said beam; and
 an upright connector adapted to connect with said beam.

8. The scaffold apparatus of claim 7, wherein said first plate flange on a first beam is adapted to be located within an interior portion of a second beam.

9. The scaffold apparatus of claim 7, wherein at least one of said end portions is adapted to be selectively located in the saddle and selectively secured thereto.

10. The scaffold apparatus of claim 7, wherein at least one of said first plate flange or said second plate flange are adapted to be selectively located in an interior of the upright connector and selectively secured thereto.

* * * * *